A. RIEBE.
BALL BEARING.
APPLICATION FILED MAR. 23, 1910.

1,027,902.

Patented May 28, 1912.

Witnesses:
Henry Hasper
Waldemar Haupt

Inventor:
August Riebe

UNITED STATES PATENT OFFICE.

AUGUST RIEBE, OF WEISSENSEE, NEAR BERLIN, GERMANY.

BALL-BEARING.

1,027,902.  Specification of Letters Patent.  Patented May 28, 1912.

Application filed March 23, 1910.  Serial No. 551,071.

*To all whom it may concern:*

Be it known that I, AUGUST RIEBE, a subject of the German Emperor, and residing at Weissensee, near Berlin, Germany, have invented certain new and useful Improvements in Ball-Bearings, of which the following is a specification.

My invention relates to ball-bearings having two grooves into which the balls are introduced laterally, and means for inserting balls into such ball-bearings.

According to my invention the outer ring has a cavity or recess of such depth that the balls can be inserted in this recess without any resistance up to the ball-race proper, no inlet recess being necessary in the inner ring, and the inlet is enlarged by a pair of jaws which engage between the rings and are forced apart by wedges, screws or the like so that the balls can pass over the rib or elevation at the recess without meeting any resistance into the center of the ball-race.

One illustrative embodiment of my invention is represented in the accompanying drawing, wherein:—

Figure 1:
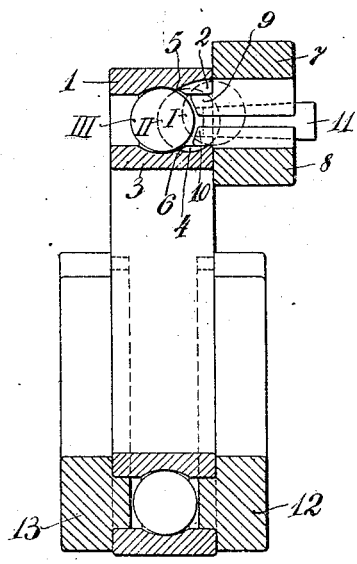
Figure 2:
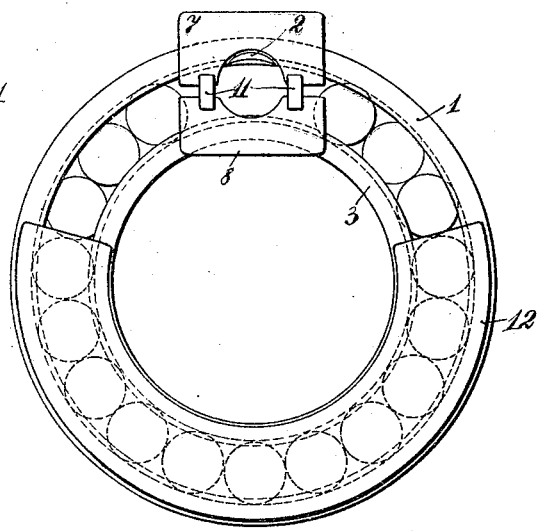
Figure 3:
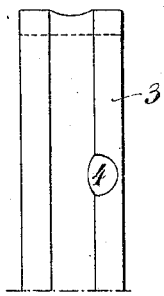
Figure 4:
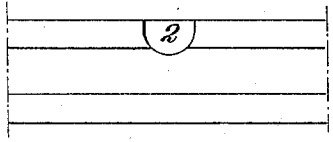

Figure 1 is a transverse section in the central plane in Fig. 2, Fig. 2 is a side elevation corresponding to Fig. 1, Fig. 3 is a plan of the inner ring, and Fig. 4 is a plan of the outer ring.

In my improved bearing the inlet is arranged only in the outer ring; the inner ring may, if necessary, have a small auxiliary recess in order to avoid the rings being sprung apart too severely in extreme cases. The inlet, and, of course, the auxiliary recess, leave the ball-race proper uninjured. In order that the balls may pass over the ribs which are formed into the ball-race, the rings are so deformed near the inlet by means of an auxiliary device, such as wedges, that the balls can fall without meeting resistance into the ball-race. When the balls are inserted into the rings the latter receive the necessary mechanical testing, namely at the weakest place, without the ball-race or the balls being injured in any manner.

Referring to the drawing, the outer ring 1 is provided with the recess or inlet 2, while the inner ring 3 has no inlet, but only, as mentioned above, a small auxiliary recess 4 for special cases. The recesses terminate a definite distance before the center of the ball-race and are separated therefrom by ribs 5 and 6. On the other side the inlet 2 in the outer ring extends up to the outer edge of ring 1, while the recess 4 never extends up to the edge of ring 3. The height of the ribs which remain or the breadth of the uninjured ball-race is such that the elastic deformations produced when inserting the balls do not exceed the admissible limit.

The recesses 2 and 4 are such that the balls can readily pass into the position I and thence into the position II when the rings are concentric. In order that the balls can pass from the position II into the final position III the rings 1 and 3 are sprung so far apart with the aid of special means that the balls can pass freely over the ribs.

The rings are simultaneously tested mechanically and the balls are inserted without either themselves or the ball-race being injured.

One form of my means for springing apart the rings is represented by way of example in the drawing. These means comprise two jaws 7 and 8 having projections 9 and 10 located between the rings and forced so far apart by means of wedges 11, driven inward by a press for example, that balls can pass freely into the ball-race. When all the balls have been inserted the stretching means are removed and the rings assume their former shape so that the balls cannot leave the ball race.

According to my invention the parts of the rings opposite the inlet may be held a definite distance apart in such manner by distance pieces 12, 13 that the balls located there are not loaded by the pressure arising when the rings are sprung apart.

I claim:—

1. The assembling means for ball-bearings of the type described, the combination of two or more members having projections adapted to be located between the outer and inner rings of a ball-bearing, and means for forcing said members and thereby said rings apart and allowing balls to pass freely between the rings into the ball-races therein.

2. In assembling means for ball-bearings of the type described, the combination of two jaws having curved projections adapted to be located between the outer and inner rings of a ball-bearing, and means for forcing said members and thereby said rings apart and allowing balls to pass freely between the rings into the ball-races therein.

3. In an assembling means for ball bearings, members having slots in the adjacent faces thereof, projections thereon adapted to be located between and in engagement with the concentric rings of a ball bearing, wedges adapted to enter said slots and force the members apart, thereby spreading the rings of the ball race and allowing a free passage for the balls yet to be inserted.

In testimony whereof, I affix my signature in the presence of two witnesses.

AUGUST RIEBE.

Witnesses:
 HENRY HASPER,
 WOLDEMAR HAUPT.

Copies of this patent may be obtained for five cents each, by addressing the "Commissioner of Patents, Washington, D. C."